Patented May 18, 1943

2,319,660

UNITED STATES PATENT OFFICE 2,319,660

COMPOSITION FOR TREATING PLASTIC MATERIALS

Arthur B. Clark, Burbank, Calif., assignor to Technicolor Motion Picture Corporation, Los Angeles, Hollywood, Calif., a corporation of Maine No Drawing. Application July 25, 1939, Serial No. 286,407

3 Claims. (Cl. 106—311)

This invention relates to a composition suitable for use in the treatment of cellulose derivatives and like plastics containing volatile plasticizing agents, the principal object of the invention being to provide a composition effective either to prevent shrinkage and deterioration or to restore the normal characteristics of such materials after having undergone a loss of their volatile constituents.

In its more specific aspects the invention is directed to the treatment of photographic film which is illustrative of that class of plastic materials containing volatile plasticizing agents which, when in use or in storage, are apt to escape with consequent shrinkage and deterioration of the film.

In accordance with the present invention I provide a composition preferably comprising as its essential ingredients an azeotropic mixture of one or more volatile organic solvents and one or more volatile plasticizing agents compatible with the composition of the material under treatment. The mixture may be in the form of either a liquid or a relatively non-fluid mass, as for example, a normally liquid volatile organic plasticizer having a boiling point of the order of 200° to 300° C. and one or more solvents having a boiling point less than 150° C., the plasticizer and solvent preferably being in such proportions as to produce a substantially azeotropic mixture. Although the mixture may be satisfactorily used in liquid form, I preferably provide an inert solidifying agent capable of absorbing on otherwise physically holding the mixture so as to form at least a semi-solid or pastelike product which may be handled conveniently. In either case the material to be treated is placed in an enclosed conditioning chamber containing the azeotropic mixture.

If it be desired quickly to restore the normal characteristics of the material under treatment, the atmosphere of the conditioning chamber may be saturated, as by spraying or atomizing the liquid azeotropic mixture therein, the duration of the treatment, the temperature conditions within the chamber, etc., being varied in accordance with the characteristics and conditions of the material under treatment. However, for most purposes sufficiently rapid restoration can be effected with the material in solid form. If it be desired merely to prevent shrinkage or deterioration of the material during transit or storage, then it is simply necessary to employ a sufficient amount of the composition to produce an atmosphere capable of balancing the loss of the volatile constituents of the material under treatment.

The volatile plasticizers which have been found suitable for use in connection with cellulose derivatives and like plastics include one or more of the following: Dimethyl phthalate, diethyl phthalate, dibutyl phthalate, dibutyl tartrate, triphenol phosphate, tricresyl phosphate, camphor, etc., all of which are compatible with the cellulose derivatives and like plastics. The organic solvents may include one or more of such compounds as ethyl alcohol, normal propyl alcohol, iso propyl alcohol, normal butyl alcohol, tertiary butyl alcohol, amyl alcohol, amyl acetate, ethyl acetate, benzene, naphtha, carbon tetrachloride, chloroform, etc., all of which are at least partially miscible with the above-mentioned plasticizers and are adapted to form substantially azeotropic mixtures having relatively high vapor pressures and capable of being readily absorbed by cellulose derivatives and like plastics.

The solidifying agents may comprise such materials as soap, glue and like proteins, clay and like colloidal fillers, asbestos fiber, wood flour, etc., or mixtures of any one or more of such materials; but in any case it is preferable, if not essential, that the solidifying agent be substantially inert in that the solvent-plasticizing mixture should have substantially no chemical effect or solvent action thereon.

For the treatment of photographic film and like materials the following compositions have been found especially satisfactory:

Example A

|                      | Grams | Weight, per cent |
|----------------------|-------|------------------|
| Camphor              | 15    | 3.1              |
| Denatured alcohol    | 47    | 9.7              |
| Iso-propanol         | 70    | 14.5             |
| Di methyl phthalate  | 53.5  | 11.1             |
| Water                | 90    | 18.7             |
| Tertiary butanol     | 12    | 2.5              |
| Lux soap flakes      | 180   | 37.3             |
| Asbestos fibers      | 15    | 3.1              |
|                      |       | 100.0            |

The camphor may first be dissolved in the alcohols, after which the phthalate may be added and the mixture then heated. The soap, after being dissolved in the water, may then be added with vigorous stirring and thereafter the asbestos fiber may be incorporated. After thorough mixing the composition is allowed to cool, whereupon it assumes a semi-solid character comparable to a stiff paste.

*Example B*

|  | Grams | Weight, per cent |
|---|---|---|
| Denatured alcohol | 7.8 | 5.6 |
| Di methyl phthalate | 11.9 | 8.5 |
| Water | 24.0 | 17.4 |
| Tertiary butanol | 30.0 | 21.6 |
| Lux soap flakes | 60.0 | 43.3 |
| Asbestos fibers | 5.0 | 3.6 |
|  |  | 100.0 |

The alcohols may first be mixed and the phthalate then added, after which the mixture is heated. The soap, after being dissolved in water, is added to the mixture and the asbestos fiber may then be incorporated. After a thorough mixing the composition is allowed to cool, whereupon it assumes a semi-solid character similar to the composition of Example A.

In using this composition for the treatment of photographic films and the like, either to prevent shrinkage or to restore the normal characteristics of shrunken film, it may be placed in a suitable flat can having a perforated cover, and the can may then be placed in a container for receiving the film to be treated. Due to the high vapor pressure of the composition, it readily vaporizes within the container and substantially saturates the atmosphere which, in the case of film not having undergone shrinkage or deterioration, is effective to balance the loss of its volatile constituents; whereas if the film has undergone shrinkage or deterioration due to loss of its volatile constituents, it absorbs the vaporized mixture and thus becomes reconditioned.

It should be understood that the present disclosure is for the purpose of illustration only and that this invention includes all modifications and equivalents which fall within the scope of the appended claims.

I claim:

1. A composition for use in the vapor phase treatment at normal temperatures of articles manufactured from cellulose derivatives and the like plastic materials containing volatile plasticizing agents, comprising approximately three parts camphor, ten parts ethyl alcohol, seventeen parts propanol-butanol mixture, eleven parts dimethyl phthalate, and nineteen parts water.

2. A composition for use in the vapor phase treatment at normal temperatures of articles manufactured from cellulose derivatives and the like plastic materials containing volatile plasticizing agents, comprising approximately three parts camphor, ten parts ethyl alcohol, seventeen parts propanol-butanol mixture, eleven parts dimethyl phthalate, and nineteen parts water, and an agent effective to render the composition relatively non-fluid, comprising a material chemically non-reactive with but capable of adsorbing the aforesaid mixture, said material being present in an amount sufficient to produce a paste-like consistency.

3. A composition for use in the vapor phase treatment at normal temperatures of articles manufactured from cellulose derivatives and the like plastic materials containing volatile plasticizing agents, comprising approximately three parts camphor, ten parts ethyl alcohol, seventeen parts propanol-butanol mixture, eleven parts dimethyl phthalate, and nineteen parts water, and approximately forty parts of a mixture of soap and asbestos fiber.

ARTHUR B. CLARK.